April 20, 1948.    C. J. T. YOUNG    2,440,133
WINDSHIELD STRUCTURE FOR USE IN AUTOMOTIVE VEHICLES EMPLOYING
ANTIGLARE LIGHT-POLARIZING ILLUMINATING AND VIEWING MEANS
Filed Aug. 9, 1944

INVENTOR.
Clinton J. T. Young
BY Donald L. Brown
Attorney

Patented Apr. 20, 1948

2,440,133

UNITED STATES PATENT OFFICE 2,440,133

WINDSHIELD STRUCTURE FOR USE IN AUTOMOTIVE VEHICLES EMPLOYING ANTI-GLARE LIGHT-POLARIZING ILLUMINATING AND VIEWING MEANS

Clinton J. T. Young, Cambridge, Mass., assignor to Polaroid Corporation, Cambridge, Mass., a corporation of Delaware Application August 9, 1944, Serial No. 548,657

1 Claim. (Cl. 88—65)

This invention relates to polarized headlighting systems for automobiles or other vehicles.

It has heretofore been proposed that polarized light be employed in the elimination of automobile headlight glare and to this end it has been suggested that all motor vehicles be provided with headlights emitting plane polarized light of predetermined polarization characteristics and be equipped also with suitable polarizing analyzer means adapted to block the polarized light from the headlights of another vehicle approaching from the front. In general the preferred type of analyzer means comprises either polarizing spectacles or a polarizing visor mounted within the automobile in such manner that it may be readily moved into and out of operative position. It has been found that the plastic sheets or films now commonly employed in the production of shatter-proof glass for motor vehicle windshields are to a considerable extent birefringent, and this birefringence has been found to create a problem in polarized headlighting systems by reason of the fact that the light emitted by polarizing headlights may have its polarization characteristics so altered by the birefringence in the windshield of an approaching vehicle that said light will not be properly extinguished or blocked by the analyzing means within said vehicle.

It is accordingly an object of the present invention to overcome the above problem and more specifically to provide means for nullifying the effects of birefringence in the windshields of motor vehicles equipped with polarizing headlights and polarizing analyzer means.

Figure 1:
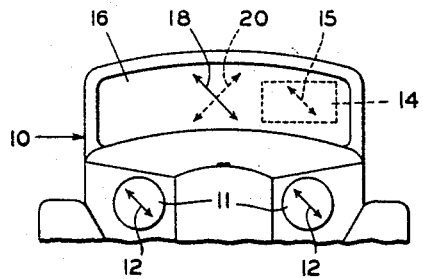
Figure 2:
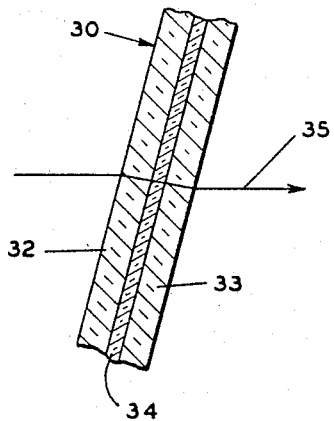

Other objects and advantages will in part appear and in part be pointed out in the course of the following detailed description of one or more embodiments of the invention which are given as non-limiting examples in connection with the accompanying drawings in which:

Figure 1 is a partially diagrammatic, fragmentary front view of an automobile equipped with polarizing headlights and analyzer and embodying a form of the invention; and Figure 2 is a diagrammatic, sectional view of a shatter-proof windshield embodying a modification of the invention.

In Figure 1, automobile 10 is illustrated as being provided with headlights 11 emitting plane polarized light having its vibration direction in the plane indicated by arrows 12. Within car 10 there is indicated a polarizing visor 14 having its transmission axis parallel to the transmission axis of the polarizing material in headlights 11, as illustrated by arrow 15. Such a system of polarized headlighting is illustrated and explained, for example, in U. S. Patents No. 2,031,045 and No. 2,087,795. It will be understood that when said car approaches a similarly equipped vehicle, light emitted by the headlights of the second vehicle will have its vibration plane at right angles to arrow 15 and will accordingly be blocked by analyzer 14. Car 10 is also provided with a shatter-proof windshield 16, and it is an object of this embodiment of the invention to prevent any birefringence existing in said windshield from so altering the polarization characteristics of polarized light incident thereon from the headlights of an approaching vehicle that said light will not be properly blocked by analyzer 14.

It has been found that the birefringence in the adhesive layers utilized in shatter-proof glass varies to a considerable extent depending upon the manner of manufacture of said adhesive material. In conventional practice the adhesive is first formed into large sheets or films which are then placed between sheets of glass and caused to adhere thereto by heat and pressure. It appears to be primarily the method of forming the adhesive into sheets which determines the birefringence. If the adhesive material is extruded in sheet form, said sheeting will in general tend to be biaxial, with the vibration directions for normally incident light respectively parallel and perpendicular to the direction of extrusion. If on the other hand, the adhesive material is formed into sheets by casting, the resulting sheeting will in general tend to be uniaxial with the optic axis substantially perpendicular to the surfaces thereof.

Fig. 1 illustrates an embodiment of the invention particularly adapted to use with a shatter-proof windshield 16 including extruded adhesive material. Arrows 18 and 20 represent the vibration directions in said adhesive, and it will be noted that they are positioned substantially parallel and perpendicular, respectively, to the axis of analyzer 14 and the vibration plane of polarized light incident thereon from the headlights of an approaching vehicle. The result of this arrangement is to nullify the effects of said birefringence and hence to prevent any alteration of the polarization characteristics of polarized light incident on windshield 16 with its vibration plane parallel or perpendicular to arrow 15.

Fig. 2 illustrates the operation of another embodiment of the invention. Windshield 30 comprises two layers of glass 32 and 33 bonded together by means of a central adhesive layer 34, with glass layer 32 as the front or outer surface layer. Arrow 35 represents light incident on windshield 30 from the headlight of an approaching vehicle and incident on the analyzer means within the vehicle whereon windshield 30 is mounted. If said windshield is tilted as shown, said light will be refracted therein, and in accordance with this embodiment of the invention, layer 34 will be so positioned that an optic axis therein will substantially coincide with arrow 35 within the windshield. Since material otherwise birefringent is optically isotropic for light travelling along an optic axis therein, the result of this arrangement will be to nullify the birefringence of layer 34.

The embodiment of the invention shown in Fig. 2 is adaptable to a variety of different cases. For example, it may be practiced with a biaxial windshield wherein one axis is inclined to the surfaces of the windshield at such an angle as to coincide with the desired direction of propagation of light therethrough. It may also be practiced with uniaxial material wherein the axis is either normal to the surfaces or inclined with respect thereto. The former case is more usual and it will be seen that for preferred results such a windshield will be positioned substantially vertically in order that light from the headlights of an approaching vehicle may impinge thereon substantially normally to the front surface thereof. Alternatively, such a windshield may be tilted an equal amount vertically and horizontally from an initially vertical position until the vibration directions therein are parallel and perpendicular to the vibration plane of the polarized light incident thereon as described above in connection with Fig. 1.

It should be noted that in general the invention is chiefly concerned with what may be termed residual birefringence, namely the birefringence remaining in the adhesive layer after lamination. In most cases the laminating process will partially remove or otherwise modify the birefringence originally imparted to the adhesive sheet by its process of manufacture, and it is the windshield in its finished form which creates the problems which concern the present invention. Modification of the above examples of the invention to take care of other or special cases will be readily apparent to those skilled in the art and are to be construed as coming within the scope hereof.

What is claimed is:

In an automotive vehicle of the class wherein a source of illumination for the pathway of the vehicle is provided to emit a beam of plane polarized light vibrating at an angle of 45° to the horizontal and wherein a light-polarizing viewing visor is provided having its transmission axis parallel to the vibration direction of said light, a windshield positioned on the vehicle in front of said viewing visor, said windshield comprising a plurality of glass sheets bonded together by a layer of plastic material possessing optical birefringence such that the principal vibration directions within said plastic layer lie in a plane substantially parallel to the surfaces of said windshield, and means positioning said windshield so that a principal vibration direction of the birefringent plastic layer thereof is at an angle of 45° to the horizontal and is parallel to the transmission axis of said visor.

CLINTON J. T. YOUNG.

REFERENCES CITED

The following references are of record in the file of this patent:

UNITED STATES PATENTS

| Number | Name | Date |
| --- | --- | --- |
| 1,182,739 | Benedictus | May 9, 1916 |
| 2,033,377 | Herrmann et al. | Mar. 10, 1936 |
| 2,168,221 | Land | Aug. 1, 1939 |
| 2,177,659 | Kimble | Oct. 31, 1939 |
| 2,237,565 | Land | Apr. 8, 1941 |
| 2,270,323 | Land | Jan. 20, 1942 |
| 2,285,792 | Bailey | June 9, 1942 |
| 2,301,126 | Kriebel | Nov. 3, 1942 |

OTHER REFERENCES

Spence article in Journal of Physical Chemistry, vol. 43, Oct. 1939, pages 865, 869, 870.

MacNally et al. article in Journal of Physical Chemistry, vol. 34, Jan.-June 1930, pages 166, 169, 170.

Chamot and Mason, Text Handbook of Chemical Microscopy, vol. I, pages 278, 279, 1930, publ. by John Wiley & Sons, N. Y.

Jenkins and White, Fundamentals of Physical Optics, pages 373, 374, 1937, publ. by McGraw-Hill Book Co., New York.